United States Patent Office 3,248,400
Patented Apr. 26, 1966

3,248,400
FUNGICIDAL AGENTS CONTAINING DITHIO-
CARBAMATE AND THIURAM DISULFIDE
RADICALS
Oskar Flieg, Limburgerhof, Pfalz, and Hermann Windel,
Ludwigshafen (Rhine), Germany, assignors to Badische
Anilin- & Soda-Fabrik Aktiengesellschaft, Ludwigs-
hafen (Rhine), Germany
No Drawing. Filed July 19, 1962, Ser. No. 211,086
Claims priority, application Germany, Aug. 17, 1957,
B 45,729
9 Claims. (Cl. 260—313)

This application is a continuation-in-part of our copending and now abandoned application Serial No. 755,134, filed August 15, 1958.

This invention relates to fungicidal agents consisting essentially of dithiocarbamate and thiuram disulfide radicals.

Dithiocarbamates and thiuram disulfides are known as reliable fungicides and/or fungistats. They are often used in plant protection by reason of their low toxic action with respect to plants and higher organisms. Attempts have been made, however, to find compounds of the said kind which are even more active. For this purpose it was necessary to synthesize very complicated and difficultly accessible compounds or else to take into account that an increase in effect was accompanied by an increase in phytotoxicity.

We have now found that fungicidal agents containing dithiocarbamate radicals, i.e. radicals of the formula

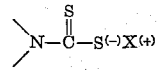

I where X is a cation, preferably a metallic one, and thiuram disulfide radicals, i.e. radicals with the group:

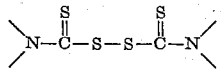

II have a more intense action against injurious fungi than equal amounts of the individual compounds. Substances with a lower content of sulfur, so-called thiuram monosulfides, and substances with a higher content of sulfur, which, as is well known, may form in the production of thiuram sulfides, lie within the scope of our invention. In spite of the increased action, the toxicity of these agents is not increased, or not appreciably increased. The agents moreover have the advantage that no complicated synthesis is necessary for their preparation.

In general the relative proportions in which the two radicals are contained in the agents are between about 2:8 and 8:2 parts by weight. However, the optimum effect of the agents may lie at other relative proportions. The relative proportion at which the optimum effect lies often depends on the injurious fungus to be combated and on the constitution of the dithiocarbamate radicals and the thiuram disulfide radicals, i.e. on the substituents which these radicals bear on the nitrogen atoms. Relative proportions of 9:1 to 1:9 also lie within the scope of the invention because even with such agents it has been found that there is a better effect than with the same amounts of the individual compounds. The optimum effect, however, usually lies within a relative proportion of 8:2 and 2:8 parts by weight.

The agents may also contain more than one dithiocarbamate radical and/or more than one thiuram disulfide radical.

The nitrogen in the dithiocarbamate radicals and thiuram disulfide radicals may be substituted by saturated or unsaturated alkyl, cycloalkyl, alkylaryl or heterocyclic radicals. The radicals may also form with the nitrogen a heterocyclic ring and may bear substituents. A preferred substituent is another nitrogen atom which in turn bears a dithiocarboxylic acid radical or may belong to a thiuram disulfide group. The nitrogen may also be acylated.

The nitrogen may bear two identical or different radicals of the said kind, or it may bear one of these radicals and a hydrogen atom.

By dithiocarbamate radicals we understand radicals of dithiocarbamic acid with mono- and polyvalent metals, for example zinc, copper, iron, manganese or sodium, or with non-metallic cations, such as the ammonium ion.

The dithiocarbamate radicals may therefore be represented by the general formula:

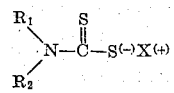

In this formula $R_1$ may represent hydrogen or an organic radical. The organic radical may be an aliphatic radical, for example methyl, ethyl, propyl, butyl, isobutyl or pentyl; the aliphatic radical may also be unsaturated. In general aliphatic radicals are chosen with 1 to 6, preferably up to 4, carbon atoms. The said organic hydrocarbon radicals may bear further substituents, as for example nitro or amino groups. If the organic radical bears an amino group, these may be present in a further dithiocarboxylic acid radical:

In this case a bis-dithiocarbamate radical is present. Since the invention resides in agents having the radical I and the radical II, the invention is not limited by the nature of the substitutents on the nitrogen.

$R_2$ in the above general formula may represent an organic radical of the nature specified under $R_1$, and $R_1$ and $R_2$ may be joined together to form a heterocyclic ring including the nitrogen. In this case —$R_1$—$R_2$— may stand for a chain of 4 to 7 atoms. They may be carbon atoms, but a carbon atom may be replaced by a nitrogen, sulfur or oxygen atom. Thus

may stand for example for the pyrrole, pyrrolidine, pyridine, piperidine, pyrimidine, morpholine or thiomorpholine radical. The chain —$R_1$—$R_2$— may also bear further substitutents, and

may therefore stand for an aminopiperidine radical. The amino group may again bear a dithiocarboxylic acid amide group.

$X^{(+)}$ in the general formula may stand for a monovalent cation or one equivalent of a divalent or polyvalent cation. The cation may be a metal of group IA, IIB, VIIA or VIII of the periodic system. It may also be an ammonium ion.

The thiuram disulfide radicals may be represented by the general formula

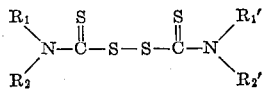

in which $R_1$, $R_2$, $R_1'$ and $R_2'$ have the meanings given above for $R_1$ and $R_2$. The nitrogen atoms in the above formula may also be substituted by radicals which in turn bear the group

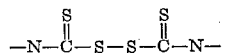

The thiuram disulfide radical may contain the grouping

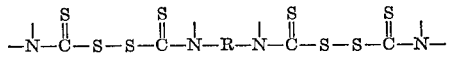

in which the monovalent radicals on the nitrogen atoms are selected from the group consisting of hydrogen and aliphatic radicals with 1 to 6 carbon atoms, and wherein the divalent radical R between the nitrogen atoms represents an aliphatic radical of from 1 to 6 carbon atoms. Such radicals have in the molecule from 2 to 100 times the sequence:

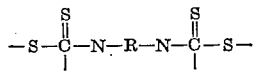

The agents are prepared by chemical methods, i.e. by reacting an amine or a mixture of two or more amines, preferably in the presence of further bases, as for example caustic soda solution, caustic potash solution or ammonia, with carbon disulfide, and precipitating a part of the dithiocarbamate with a soluble metal salt, for example zinc sulfate to form a water-insoluble dithiocarbamate and then oxidizing the remaining soluble dithiocarbamate to form the thiuram disulfide. As has been said above, substances with a lower content of sulfur, so-called thiuram monosulfides, or substances with a higher content of sulfur, depending on the reaction conditions, may also form. The metal salts of the dithiocarbamic acids may be precipitated during the partial oxidation or subsequently. Mixtures of dithiocarbamic acids may also be used for this process. Before mixing the dithiocarbamic acids it is also possible however first to precipitate a part as carbamate and to mix and then oxidize the remaining fraction of free dithiocarbamic acids to thiuram disulfides. By simultaneous partial oxidation of the dithiocarbamic acids and precipitation of the water-insoluble dithiocarbamates, especially effective agents are obtained. The sequence of the reactions is discretionary. So is the number of steps into which the reactions are subdivided. It is important, however, that the composition of the agent should be within the limits given above.

In the chemical complexes thus obtainable the dithiocarbamates and thiuram disulfides are present, not as separate substances, but as radicals that are connected to each other. The agents according to the present invention are therefore clearly distinguished from mixtures of individual substances, no claim being made to the latter.

The dithiocarbamic acids are obtained, as already stated above, for example by reacting an amine which bears on the nitrogen organic radicals $R_1$ and $R_2$, having the above meanings, and one hydrogen atom, or mixtures of such amines, in the presence of further bases, such as caustic soda solution, caustic potash solution or ammonia, with carbon disulfide. Thus for example the following amines may be reacted with carbon disulfide: alkylamines such as methylamine, ethylamine, propylamine, butylamine, pentylamines or hexylamines, with normal or branched chains, or dialkylamines, such as dimethylamine, diethylamine, dipropylamine, dibutylamine, dipentylamines, or dihexylamines. In the case of dialkylamines, the nitrogen may also bear different substituents, as for example methylethylamine and methylpropylamine. The substituents may themselves be further substituted, for example by a nitro or amino group. The substituents may also be closed to a ring, either only by way of carbon atoms or by way of additional hetero atoms. Examples of such amines are pyrrolidine, piperidine, hexamethylene imine, morpholine, thiomorpholine dioxide and aminopyrimidine. Diamines may also be used, for example ethylene diamine, propylene diamine-(1.3) or -(1.2), diethylene triamine or cyclohexyl diamine.

The preparation of some of the agents will now be described:

(1) A mixture of 100 grams of concentrated sulfuric acid, 100 grams of 35% hydrogen peroxide and 195 grams of 70% zinc chloride solution in 2 liters of water is slowly added at 0° to 10° C. with powerful stirring to 2 liters of an aqueous solution containing 1 mole of pyrrolidyldithiocarbamic acid sodium salt and 1.5 moles of ethylene-bis-dithiocarbamic acid sodium salt. The whole is stirred for another hour, filtered by suction, washed, and dried under reduced pressure at 40° C.

(2) A mixture of 1.5 moles of methyldithiocarbamic acid sodium salt and 2.5 moles of dimethyldithiocarbamic acid sodium salt has added to it, for the purpose of oxidation, a mixture of 100 grams of concentrated sulfuric acid and 100 grams of hydrogen peroxide (35%) in 1 liter of water. A solution of 136 grams of zinc chloride in 1 liter of water is added and the remaining free carbamic acids are thus converted into the zinc salts; the whole is stirred for another hour, filtered by suction, washed and dried under reduced pressure at 40° C.

The yields obtained are high. In general they lie between 90 and 95% of the calculated amount.

The dithiocarbamate radicals in the agents may contain not only salts of one metal, but also mixtures of salts of several metals, for example salts of zinc, iron and manganese. The amount of the cations can be varied within the wide limits.

The agents of this invention are eminently suitable for combating injurious fungi, such as are found, for example, on leaves, stems, roots, seeds, and fruits or crops, horticultural, and ornamental plants.

The agents are also suitable for combating fungi on soil, timber, textiles, paper and other dead material.

The agents of this invention can be processed in known manner into dusting powders by means of diluents, or with the addition of dispersing, wetting and adhesive agents to solid or liquid preparations for spraying. As diluents there may be used for example clays or talcum, as wetting agents for example ligninsulfonic acid sodium salt or arylsulfonates and as adhesive agents for example maleic acid/styrene condensation products and casein. The incorporation of other fungicides and/or insecticides is also possible.

The unforeseeable advantageous effect of the agents of this invention may be seen from the following experimental results. The experimental conditions are: Leaves of grapevines planted in pots were sprayed with aqueous dispersions of finely ground preparations of 80% of active material or mixture of active materials and 20% of sodium lignin sulfonate, and after the sprayed-on coating has dried, infected by spraying on a spore suspension of grape vine peronosopra (*Plasmopara viticola*). The plants were then placed for 12 hours in a room saturated with water vapor at 20° C. and then for 8 days in a greenhouse having temperatures between 20° and 30° C. To accelerate and intensify the ejection of the spores, the plants are again placed in the moist room for 12 hours. Then the spore deposits on the underside of the leaf are counted.

The tables give the attack values, of which the absolute value varies in the individual experiments depending on various influences, such as light, temperature, age and fertilization of the test plants.

TABLE 1

*Zinc ethylene-bis-dithiocarbamate (Zineb) radicals +dipyrrolidylthiuram disulfide radical (DPTD)*

| Proportion of radicals in the agent | | Percentage of attacked leaves after spraying with liquor containing the following percentage of active substance: | | | |
|---|---|---|---|---|---|
| Zineb | DPTD | 0.016 | 0.031 | 0.063 | 0.125 |
| EXPERIMENT 1 | | | | | |
| 100 | 0 | 13.2 | 5.6 | 8.3 | 0 |
| 80 | 20 | 0 | 0 | 0 | 0 |
| 60 | 40 | 1.3 | 0 | 0 | 0 |
| 40 | 60 | 3.9 | 1.3 | 0 | 0 |
| 20 | 80 | 1.1 | 3.8 | 0 | 0 |
| 0 | 100 | 11.9 | 11.8 | 11.3 | 6.0 |
| Controls: 80.9% of attacked leaves. | | | | | |
| EXPERIMENT 2 | | | | | |
| 100 | 0 | 17.0 | 11.4 | 17.5 | 12.9 |
| 80 | 20 | 7.4 | 0 | 0 | 0 |
| 60 | 40 | 4.5 | 0 | 0 | 0 |
| 40 | 60 | 8.0 | 0 | 0 | 0 |
| 20 | 80 | 8.8 | 4.8 | 0 | 0 |
| 0 | 100 | 31.7 | 40.2 | 35.0 | 16.6 |
| Controls: 81.9% attacked leaves | | | | | |
| EXPERIMENT 3 | | | | | |
| 100 | 0 | 10.0 | 9.8 | 2.4 | 0 |
| 75 | 25 | 3.0 | 0 | 0 | 0 |
| 50 | 50 | 0 | 0 | 0 | 0 |
| 0 | 100 | 9.5 | 6.3 | 5.0 | 0 |
| Controls: 91.0% attacked leaves. | | | | | |

TABLE 2

*Zinc ethylene-bis-dithiocarbamate (Zineb) radical +tetraethyl thiuram disulfide radical (TETD)*

| Proportion of radicals in the agent | | Percentage of attacked leaves after spraying with liquor containing the following percentage of active substance: | | | |
|---|---|---|---|---|---|
| Zineb | TETD | 0.016 | 0.031 | 0.063 | 0.125 |
| 100 | 0 | 14.3 | 13.5 | 5.8 | 2.2 |
| 50 | 50 | 8.3 | 1.5 | 0 | 0 |
| 0 | 100 | 66.9 | 28.8 | 23.6 | 6.5 |
| Controls: 92.6% attacked leaves. | | | | | |

TABLE 3

*Zinc ethylene-bis-dithiocarbamate radical+thiuram disulfide radical from ethylene diamine (PETD)*

| Proportion of radicals in the agent | | Percentage of attacked leaves after spraying with liquor containing the following percentage of active substance: | | | |
|---|---|---|---|---|---|
| Zineb | PETD | 0.016 | 0.031 | 0.063 | 0.125 |
| EXPERIMENT 1 [Mechanically mixed] | | | | | |
| 100 | 0 | 26.4 | 22.5 | 18.8 | 10.2 |
| 80 | 20 | 25.0 | 2.5 | 0 | 0 |
| 0 | 100 | 73.2 | 9.5 | 7.1 | 0 |
| Controls: 87.5% of attacked leaves. | | | | | |
| EXPERIMENT 2 [Mechanically mixed as well as zinc salt precipitation and oxidation simultaneously] | | | | | |
| 100 | 0 | 70.7 | 70.0 | 56.5 | 17.4 |
| 80 | 20 | 45.3 | 18.2 | 4.2 | 0 |
| [Mechanically mixed] | | | | | |
| 80 | 20 | 22.9 | 10.7 | 3.6 | 0 |
| [Simultaneous zinc salt precipitation and oxidation] | | | | | |
| 0 | 100 | 60.0 | 34.1 | 4.8 | 0 |
| Controls: 100% attacked leaves | | | | | |

The foregoing Experiment 2 shows clearly the improved fungicidal activity of the agents of this invention over the corresponding mixtures.

As may be seen from the comparative values, the new highly active mixtures make possible a considerable saving in active substance as compared with the amounts necessary when using the components individually.

Similar agents can be prepared for example from one or more of the compounds in the left-hand column with one or more of the compounds in the right-hand column:

TABLE 4

| Dithiocarbamate radicals of the following acids | Thiuram disulfide radicals |
|---|---|
| Dimethyldithiocarbamic acid. Ethylene-bis-dithiocarbamic acid. Pyrrolidyldithiocarbamic acid. Methyl-dithiocarbamic acid. (For example the iron, zinc or manganese salts). | Tetramethyl thiuram disulfide. Polyethylene thiuram disulfide (from ethylene diamine). Dipyrrolidyl thiuram disulfide. Dimethyl thiuram disulfide. |

What we claim is:

1. A process for the production of a chemical complex having fungicidal properties which consists essentially of adding to an aqueous solution of a salt of a dithiocarbamic acid selected from the group consisting of alkyldithiocarbamic acids, said alkyl being of 1 to 6 carbon atoms, dialkyldithiocarbamic acids, the alkyls being of 1 to 6 carbon atoms, pyrrolidyldithiocarbamic acid, piperidyldithiocarbamic acid, the dithiocarbamic acid of diethylene triamine, the dithiocarbamic acid of hexamethylene imine, morpholyldithiocarbamic acid, thiomorpholyldithiocarbamic acid, the dithiocarbamic acid of thiomorpholine dioxide, ethylene-bis-dithiocarbamic acid, propylene-bis-dithiocarbamic acid-(1,2), propylene-bis-dithiocarbamic acid-(1,3) and cyclohexylene-bis-dithiocarbamic acid, the cation of said salt of a dithiocarbamic acid being selected from the group consisting of the metals of groups IA, IIB, VIIA, and VIII of the Periodic System and the ammonium ion (1) a soluble salt containing a cation selected from the group consisting of zinc, copper, manganese and iron, the amount of said cation being sufficient to precipitate as an insoluble salt from about 10% to about 90% of said dithiocarbamic acid and (2) an oxidizing agent, the amount of said oxidizing agent being sufficient to oxidize from about 90% to about 10% of said dithiocarbamic acid to thiuram disulfides, the total amount of said cation and said oxidizing agent being sufficient to displace said dithiocarbamic acid from said aqueous solution.

2. A process as in claim 1 wherein said aqueous solution of a salt of a dithiocarbamic acid is formed by reacting carbon disulfide with an amine selected from the group consisting of alkylamines, said alkyl being of 1 to 6 carbon atoms, dialkylamines, said alkyls being of 1 to 6 carbon atoms, pyrrolidine, piperidine, diethylene triamine, hexamethylene imine, morpholine, thiomorpholine, thiomorpholine dioxide, aminopyrimidine, ethylene diamine, (1,2)-propylene diamine, (1,3)-propylene diamine and cyclohexyl diamine; said reaction taking place in the presence of a basic solution.

3. A process as in claim 1 wherein the oxidizing agent and the cation-containing soluble salt are added to the aqueous solution of a salt of a dithiocarbamic acid at substantially the same time.

4. The process of claim 2 wherein both ethylene diamine and pyrrolidine are reacted with carbon disulfide to form said salt of a dicarbamic acid.

5. The process of claim 2 wherein both ethylene diamine and diethylamine are reacted with carbon disulfide to form said salt of a dicarbamic acid.

6. The process of claim 2 wherein both ethylene diamine and methylamine are reacted with carbon disulfide to form said salt of a dicarbamic acid.

7. The process of claim 7 wherein both ethylene diamine and dimethylamine are reacted with carbon disulfide to form said salt of a dicarbamic acid.

8. The process of claim 2 wherein ethylene diamine is reacted with carbon disulfide to form said salt of a dicarbamic acid.

9. The product of the process of claim 1.

References Cited by the Examiner

UNITED STATES PATENTS

| | | | |
|---|---|---|---|
| 1,972,961 | 9/1934 | Tisdale | 167—22 |
| 2,187,719 | 1/1940 | Williams | 260—239 |
| 2,333,084 | 11/1943 | Flenner et al. | 167—22 |
| 2,342,481 | 2/1944 | Muller | 167—22 |
| 2,457,674 | 12/1948 | Heuberger | 167—22 |
| 2,561,208 | 7/1951 | Kirk | 260—293.48 |
| 2,842,554 | 7/1958 | Sullivan | 260—313 |
| 3,067,090 | 12/1962 | Bel | 260—247.1 |

NICHOLAS S. RIZZO, *Primary Examiner.*

MARY U. O'BRIEN, *Assistant Examiner.*